Nov. 20, 1923
F. E. LOUDY
SHOCK ABSORBING WHEEL
Filed April 8, 1921
1,474,420
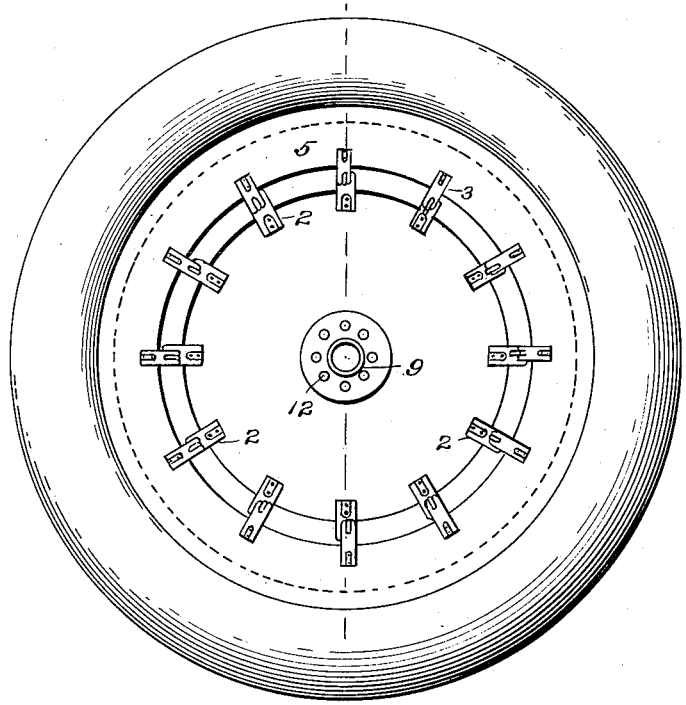
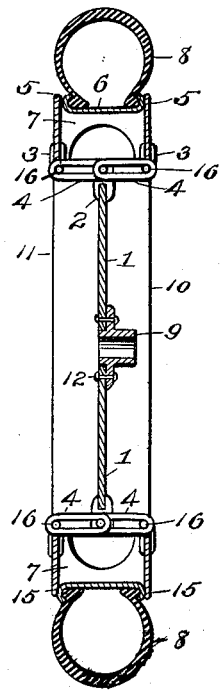
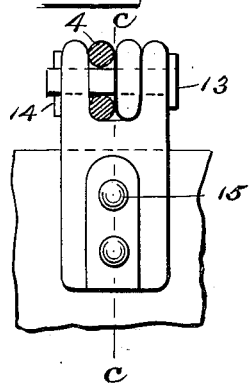
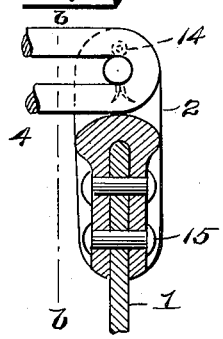

UNITED STATES PATENT OFFICE.

FLAVIUS E. LOUDY, OF PHILADELPHIA, PENNSYLVANIA.

SHOCK-ABSORBING WHEEL.

Application filed April 8, 1921. Serial No. 459,645.

*To all whom it may concern:*

Be it known that I, FLAVIUS E. LOUDY, a citizen of the United States, residing at Philadelphia, in the county of Philadelphia and State of Pennsylvania, have invented certain new and useful Improvements in Shock-Absorbing Wheels, of which the following is a specification.

This invention relates to shock absorbing wheels in general and particularly to shock absorbing means so devised as to permit the wheel to take up lateral strains as well as the usual vertical thrusts or shocks. I am aware that it is not new to provide a wheel composed of two or more sections which are spaced apart by means of such resilient material as to enable it to take up any shocks without conveying the same to the body of the vehicle supported thereby. Such devices as are shown by patent to Bernat, No. 796,298, of August 8, 1905, and Cleret, No. 1,105,321, of July 28, 1914, are examples of such wheels. Both of these patents show means to provide for taking up vertical thrusts. It is the object of my invention, however, to provide a full floating wheel that will take up not only vertical thrust but lateral thrusts as well.

It is of great importance in the construction of wheels for aircraft that shock absorbing means be provided to take care of lateral strains. It is very often necessary to make cross wind landings with airplanes with the result that the force of the wind blowing against the side of the fuselage, and in the case of dihedral planes particularly, against the wings of the plane, causes a very severe side strain upon the under carriage and wheels of the plane. The result is that very frequently the wheels give away and the plane is wrecked. Again when it is necessary to make a landing in a limited space it is often necessary for the aviator to turn his plane on the ground very sharply after landing to prevent striking obstacles. The inertia of the plane in such a maneuver again throws a tremendous side strain on the wheels which frequently results in their collapsing. It is my purpose in this invention to overcome, at least to a certain extent, the destructive effect of this lateral strain. The complete description of my invention will be found in the accompanying specification in which—

Figure 1 is a side elevation of the wheel embodying my invention;

Figure 2 is a cross section taken on the line *a—a* of Figure 1;

Figure 3 is a detailed showing partly in section on the line *b—b* of Fig. 4 of the means attaching the shock absorbing bands to the main wheel disk;

Figure 4 is a detailed view partly in section on the line *c—c* of Figure 3.

In the accompanying drawings 1 is a disk which forms the inner of the two separable sections of my resilient wheel. This disk 1 is attached to the hub 9 by the bolts 12 as shown. At the outer periphery of disk 1 equally spaced brackets 2 are secured by means of rivets 15. Bracket 2 is provided with a pin 13 which serves as an anchorage for the inner ends of the resilient bands 4. Cotter pins 14 are provided for the pins 13. The outer or rim section of the wheel 5 is composed of two circular disks adapted to secure the usual rim 6 and tire 8. At the inner periphery of the section 5 there are again equally spaced brackets 3 which serve with their pins 16 as anchorage for the outer end of the resilient shock absorbing band. Equally spaced transverse stiffening plates 7, so shaped as to leave sufficient clearance for a vertical thrust of plate 1, are provided against the tension of the bands 4. 10 and 11 are showings of a stream lining or fairing provided for the purpose of cutting down head resistance when in flight. The resilient bands 4 are placed under a considerable initial tension.

From the foregoing my device will be seen to operate as follows. Any shock to the wheel in a vertical plane will be taken care of by both sets of resilient bands. It will be noted that the destructive effect of any lateral shock to the right or left will be greatly diminished by the shock absorbing effect of the stretching of the left or right sets of resilient members, respectively.

My device is exceedingly simple in structure and would readily be capable of manufacture on the production basis. It will be noted that it will be easy to assemble and that the parts thereof will be replaceable. The multiplicity of the separate resilient members provide against the destruction of the wheel in case of the failure of one or more of the resilient members. All of these features are of extreme importance to such wheels in general and particularly to wheels manufactured for use in aircraft.

I claim:

1. In combination, in a resilient wheel system, a central disk mounted on the hub of the wheel at right angles to the axis thereof, equally spaced brackets mounted circumferentially on said disk, a rim section comprising a rim and two spaced annular disks disposed in planes parallel to said central disk, circumferentially and one to each side thereof, and each provided with equally spaced brackets to correspond with the brackets of said central disk, pins mounted in said central disk brackets and said rim section disk brackets, and endless elastic bands between each central disk bracket pin and the two corresponding rim disk bracket pins, and disposed parallel to the axis of the wheel for operably connecting said rim section to said central disk portion in such a manner as to provide a relative universal movement between the rim and the disk.

2. In combination, in a resilient wheel system, a central disk mounted on the hub of the wheel at right angles to the axis thereof, equally spaced brackets mounted circumferentially on said disk, a rim section comprising a rim and two spaced annular disks disposed in planes parallel to said central disk, circumferentially and one to each side thereof, and each provided with equally spaced brackets to correspond with the brackets of said central disk, pins mounted in said central disk brackets and said rim section disk brackets, and endless elastic bands between each central disk bracket pin and the two corresponding rim disk bracket pins, and disposed parallel to the axis of the wheel for operably connecting said rim section to said central disk portion, in such a manner as to provide a relative universal movement between the rim and the disk, said endless elastic bands being the sole connecting means between said rim portion and said central disk portion.

In testimony whereof I have affixed my signature.

FLAVIUS E. LOUDY.